(12) United States Patent
Volodarsky et al.

(10) Patent No.: US 7,797,432 B2
(45) Date of Patent: Sep. 14, 2010

(54) SHARING STATE INFORMATION BETWEEN DYNAMIC WEB PAGE GENERATORS

(75) Inventors: Michael D. Volodarsky, Bellevue, WA (US); Rayner Shawn D'Souza, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 474 days.

(21) Appl. No.: 11/552,914

(22) Filed: Oct. 25, 2006

(65) Prior Publication Data

US 2008/0104255 A1    May 1, 2008

(51) Int. Cl.
G06F 15/16    (2006.01)

(52) U.S. Cl. .................. 709/228; 709/227; 709/203; 707/999.107

(58) Field of Classification Search ............. 707/104.1, 707/999.107; 709/203, 227, 228
See application file for complete search history.

(56) References Cited

U.S. PATENT DOCUMENTS

| | | | |
|---|---|---|---|
| 6,480,894 B1 | 11/2002 | Courts et al. | |
| 6,877,111 B2 | 4/2005 | Sharma et al. | |
| 6,912,569 B1 | 6/2005 | Sharma et al. | |
| 2003/0023754 A1* | 1/2003 | Eichstadt et al. | 709/246 |
| 2003/0110266 A1* | 6/2003 | Rollins et al. | 709/227 |
| 2003/0135821 A1 | 7/2003 | Kouznetsov | |
| 2003/0233433 A1 | 12/2003 | Halpern | |
| 2004/0199609 A1 | 10/2004 | Papatla et al. | |
| 2005/0021862 A1* | 1/2005 | Schroeder et al. | 709/246 |
| 2005/0203952 A1* | 9/2005 | Deily et al. | 707/104.1 |
| 2006/0026668 A1 | 2/2006 | Karoubi | |
| 2006/0041862 A1 | 2/2006 | Moussallam et al. | |
| 2006/0277596 A1* | 12/2006 | Calvert et al. | 726/3 |
| 2007/0061467 A1* | 3/2007 | Essey et al. | 709/227 |
| 2007/0169096 A1* | 7/2007 | Chea et al. | 717/168 |

OTHER PUBLICATIONS

Srivastava, Manoj, et al., Hanu Software Solutions for Success, ASP to ASP.NET Migration.
ASP to ASP.NET Migration Assistant.
Mitchell, Scott, Converting ASP to ASP.NET Upgrading to Microsoft.NET, Nov. 2001.
Syme, Don, ILX: Extending the .NET Common IL for Functional Language Interoperability, Electronic Notes in Theoretical Computer Science, Babel 2001 Preliminary Version, 20 pages.
Dutta, S.K., Migrating Enterprise Applications to the .NET Framework, 9 pages.
Abramson, David, et al., Guard: A Tool for Migrating Scientific Applications to the .NET Framework, School of Computer Science & Software Engineering, Monash University.

* cited by examiner

Primary Examiner—Wing F Chan
Assistant Examiner—Hitesh Patel
(74) Attorney, Agent, or Firm—Workman Nydegger (57) ABSTRACT

Embodiments of the present invention are directed to systems and methods for sharing session state information between the web page generation infrastructures. A web page generation infrastructure receives a request for a web page from a client computer system, where the request is directed to one of the other web page generation infrastructures. The managing web page generation infrastructure accesses a session state container to determine whether session state information for an existing session with the client exists. The computer system transfers the request and the state information to an object configured to interface with the other web page generation infrastructure. The computer system receives a response to the request and modified session state information from the object. The managing web page generation infrastructure copies the modified session state information to the session state container. The managing web page generation infrastructure returns the response to the client computer system.

12 Claims, 4 Drawing Sheets

SHARING STATE INFORMATION BETWEEN DYNAMIC WEB PAGE GENERATORS

BACKGROUND

As the internet has grow both in size and functionality, more and more services have been made available to internet users. Online shopping, banking, email and other web-based applications are used every day by millions around the world. Such applications, however, require a more sophisticated architecture than Hypertext Transfer Protocol (HTTP) was originally designed to provide. For example, HTTP is a stateless protocol. Thus, when a user connects to a web server, the web server responds with a reply, but does not maintain a memory the transaction and thus, if the same user sent another request to the same web server, the web server would not relate the new request to the previous one. Many web applications, however, require the server to remember not only the user's previous requests, but also the results of the transaction. For example, if a user was browsing an online bookstore and had selected one book to purchase but wanted to continue shopping, the user would want the server to remember which books the user had already looked at and which ones had been marked for purchase. One solution to this problem is to use cookies.

Cookies are small text files stored locally on the client's computer system and are used to identify the client to the server. Typically, a unique identifier (e.g. a string of numbers and/or characters) is assigned to the client. Then, when the client sends a request to the web server, the request includes the unique ID. The web server can then associate any previously stored information related to that user (i.e. session state information) and use the session state information to provide a more customized experience for the client. Session state information is used in a variety of situations where it is advantageous to dynamically generate a web page requested by a user. Applications such as online banking and online shopping necessitate the creation of web pages suited specifically for the user and for that particular session. Solutions for dynamically creating web pages include Active Server Pages (ASP), ASP.NET, PHP: Hypertext Preprocessor (PHP), Ruby on Rails, and others.

In general, dynamic web page generators, such as those mentioned above, are incompatible with each other. For instance, if a client sent a PHP request to a web server that was running ASP, the ASP web page generator would not be able to create the web page because ASP would not understand the request. Similarly, if a client sent an ASP request to a server running ASP.NET, the ASP.NET web page generator would be unable to generate the web page because of incompatibility between the systems. This can create large problems for corporations that have invested large amounts of time and money in older solutions such as ASP and now desire to switch to newer solutions such as ASP.NET. Solutions such as ASP, for example, lack the ability to scale onto multiple web servers or be managed from a single point.

Attempts have been made to reconcile the incompatibility between different web page generators. For example, in situations where a portion of the web server's content is available via ASP and another portion is available via ASP.NET, a user may (without knowing it) browse to both portions of content. Thus, in such cases, the ASP web page generator would need to know what information had been processed by the ASP.NET web page generator and vice versa. Solutions for sharing session state information between dynamic web page generators typically include major changes to the client's computer system and/or the client's web browser. Other solutions include, for example, receiving a request for an ASP-generated web page, processing the request with the ASP web page generator, storing the session information into an external storage, and then pointing the other web page generator (e.g. ASP.NET) to the external storage. Such solutions are often intrusive and/or cumbersome.

BRIEF SUMMARY

Embodiments of the present invention are directed to systems and methods for sharing session state information between dynamic web page generators. In one embodiment of this invention, a computer system performs a method for sharing session state information between web page generation infrastructures. A managing web page generation infrastructure receives a request for a web page from a client computer system, where the request is directed to one of the other web page generation infrastructures. The managing web page generation infrastructure accesses a session state container to determine whether session state information for an existing session with the client exists. Upon determining that session state information for the existing session exists, the computer system transfers the request and the state information to an object configured to interface with the other web page generation infrastructure. The computer system receives a response to the request and modified session state information from the object, where the response has been generated by and the modified session state information has been modified by the other web page generation infrastructure. The managing web page generation infrastructure copies the modified session state information to the session state container. The managing web page generation infrastructure returns the response to the client computer system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Embodiments of the present invention are directed to systems and methods for sharing session state information between dynamic web page generators. In one embodiment of this invention, a computer system performs a method for sharing session state information between web page generation infrastructures. A managing web page generation infrastructure receives a request for a web page from a client computer system, where the request is directed to one of the other web page generation infrastructures. The managing web page generation infrastructure accesses a session state container to determine whether session state information for an existing session with the client exists. Upon determining that session state information for the existing session exists, the computer system transfers the request and the state information to an object configured to interface with the other web page generation infrastructure. The computer system receives a response to the request and modified session state information from the object, where the response has been generated by and the modified session state information has been modified by the other web page generation infrastructure. The managing web page generation infrastructure copies the modified session state information to the session state container. The managing web page generation infrastructure returns the response to the client computer system. The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Figure 1:
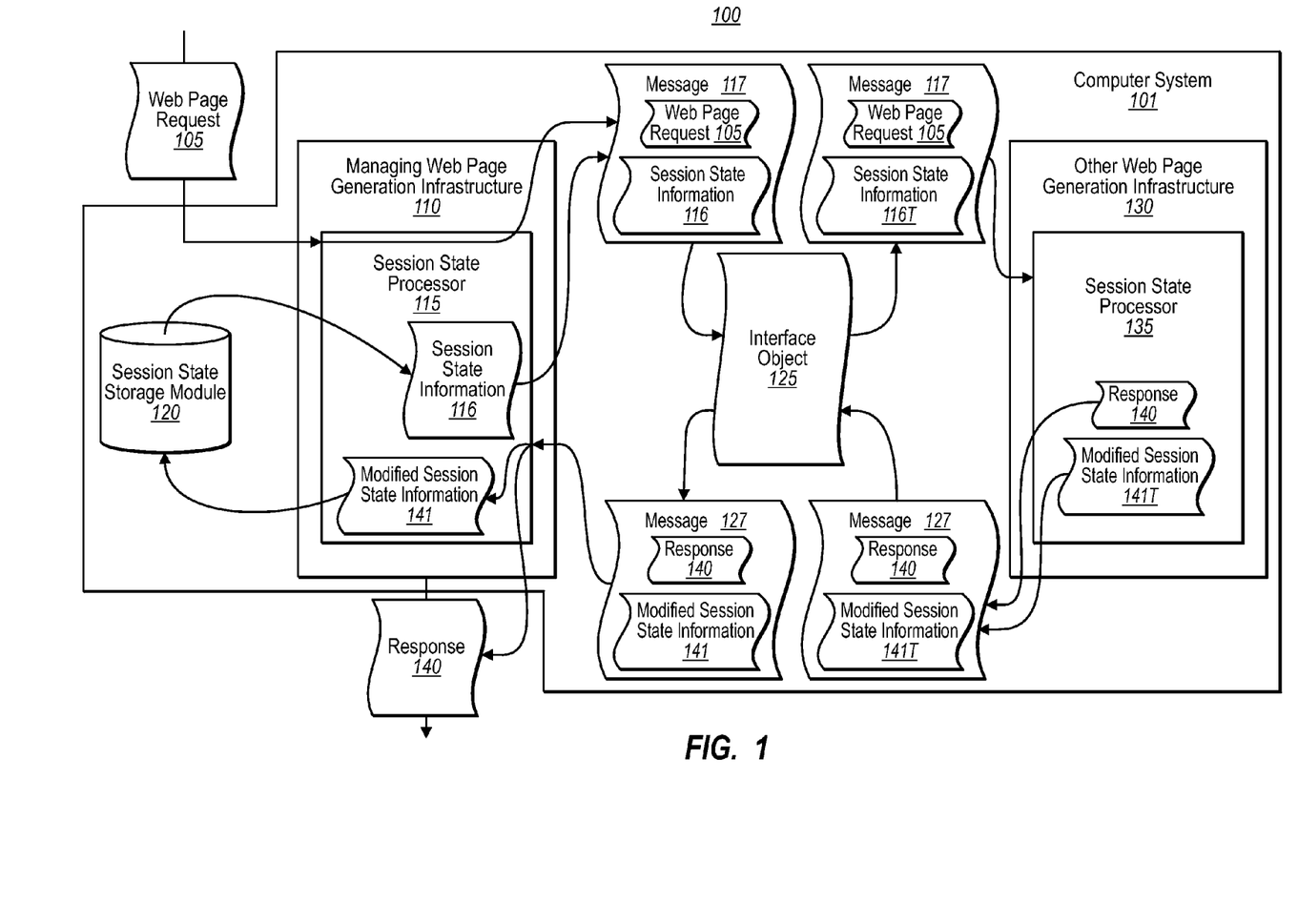
FIG. 1 illustrates a computing environment in which embodiments of the present invention may operate including sharing session state information between web page generation infrastructures.

FIG. 1 illustrates a computer architecture 100 in which the principles of the present invention may be employed. As depicted in computer architecture 100, computer system 101 includes components configured to receive one or more web page requests (e.g., request 105) and generate and send corresponding responses (e.g. response 140) to requesting client computer systems (not shown). Web page request 105 can include various types of information such as: identification of the client computer that sent the request (e.g. Internet Protocol (IP) address, browser type, operating system, etc.), uniform resource locator (URL) of the requested web page, cookie information such as session identifiers, authorization levels, previous session information, etc., and any other type of information that can be used for processing a web page request.

Computer system 101 also includes managing web page generation infrastructure 110 and other web page generation infrastructure 130. In general, web page generation infrastructures are any programs, scripting/programming languages, or architectures that allow dynamic generation of a web page. For example, if a computer user is browsing a web site that offers items for sale and the web site has a shopping cart system, the user may place items in the shopping cart for later purchase. Websites that use shopping carts or similar programs that allow each user to customize the content of the web page (e.g. by placing various items in the shopping cart) typically implement some form of a web page generation infrastructure. Examples of web page generation infrastructures that can generate web pages dynamically include Active Server Pages (ASP), ASP.NET, PHP: Hypertext Preprocessor (PHP), Ruby on Rails, and others.

As explained above, to allow stateless HTTP servers to remember a web site user's previous requests, most web sites create sessions between the web server and the client computer system (by storing session state information). Accordingly, each web page generation infrastructure at computer system 101 can include a session state processor. For example, managing web page generation infrastructure 110 includes session state processor 115 and other web page generation infrastructure 130 includes session state processor 135. In some embodiments, session state processor 115 may be configured to process session state information in a format compatible with processor 115. Similarly, in some embodiments, session state processor 135 may be configured to process session state information in a format compatible with processor 135.

Session state processor 115 contains session state information 116. Session state information 116 can include the user's user name, password, items placed in a virtual shopping cart, account information, previous requests, searches, items looked at and/or purchased, client identification information, or any other type of information relevant to a session between a web server and a client computing system. Session state processor 115 can be used to establish, monitor, control, or otherwise maintain a session between a web server and a client. Session state processor 115 may also be configured to search session state storage module 120 to determine whether any prior session state information exists for the client that sent the current request. Session state processor 135 may perform functions similar to module 115 and may be further be used to modify session state information.

Computer system 101 also includes message 117 which includes both session state information 116 and web page request 105. In some embodiments, message 117 may be sent from managing web page generation infrastructure 110 to interface module 125. Interface module 125 may be any type of program, script, platform, or program architecture that facilitates communication between web page generation infrastructures (e.g. infrastructures 110 and 130). For example, interface module 125 may be a component object model (COM) object. COM objects can be created using a variety of programming languages and allow for intercommunication between processes. In some embodiments, interface object 125 is configured to receive message 117 and modify and/or translate the information within the message in such a way that session state information 116T and web page request 105 can be used by (i.e., are compatible with) other web page generation infrastructure 130 and session state processor 135. Similarly, interface object 125 may be configured to receive message 127, including modified session state information 141T, and modify and/or translate the modified information such that modified session state information 141 can be used by managing web page generation infrastructure 110 and/or session state processor 115 to generate propagate 140.

Figure 2:
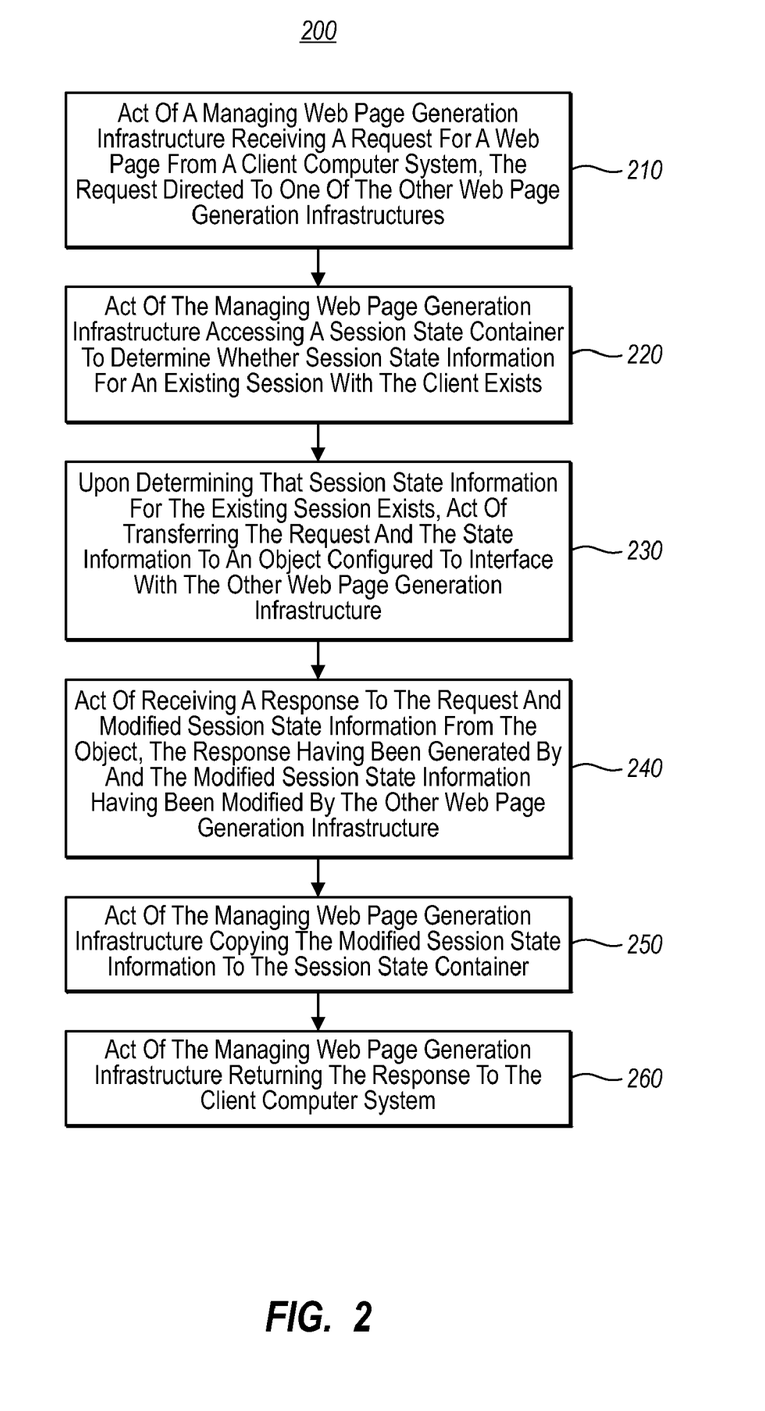
FIG. 2 illustrates a flowchart of a method for sharing session state information between web page generation infrastructures.

FIG. 2 illustrates a flowchart of a method 200 for sharing session state information between web page generation infrastructures. As the method 200 may be performed in the context of the computer architecture 100 of FIG. 1, the method 200 of FIG. 2 will now be described with frequent reference to FIG. 1.

The method 200 of FIG. 2 includes an act of a managing web page generation infrastructure receiving a request for a web page from a client computer system, the request directed to one of the other web page generation infrastructures (act 210). For example, managing web page generation infrastructure 110 (e.g. ASP.NET) may receive web page request 105 from a client computer system where request 105 is directed to other web page generation infrastructure 130 (e.g. ASP). In some embodiments, request 105 comprises an HTTP request sent from a web browser on the client computer system. The request 105 may include many types of information including client identification information, session information including previously stored sessions, cookie information and any other type of information commonly sent in an HTTP request. In some cases, request 105 can include information indicating which type of web page generating infrastructure to use when generating a web page based on the request.

In cases where a website has multiple portions and each portion is provided by a different web page generation infrastructure, the processing of dynamic web pages can be controlled from a single point: managing infrastructure 110. Furthermore, in some cases, the managing infrastructure can create sessions without using cookies. This is useful for devices that typically do not use cookies such as mobile devices, or for applications in which cookies have been disabled. Other features of managing infrastructures such as managing infrastructure 110 may also be available to portions of websites such as identification (ID) security, extensible provider-based storage and web farm support.

The method 200 of FIG. 2 includes an act of the managing web page generation infrastructure accessing a session state container to determine whether session state information for an existing session with the client exists (act 220). For example, managing web page generation infrastructure 110 may access session state storage module 120 to determine whether session state information 116 for an existing session with the client exists. In some cases, a client may have browsed a web site at some point in the past. Session state information 116 created during the past session may have been saved in session state storage module 120. In one embodiment, session state information 116 may include information relating to items browsed and entered into an online shopping cart via a web browser.

The method 200 of FIG. 2 includes upon determining that session state information for the existing session exists, an act of transferring the request and the state information to an object configured to interface with the other web page generation infrastructure (act 230). For example, upon determining that session state information 116 for the existing session exists, the computer system transfers web page request 105 and session state information 116 (included in message 117) to interface object 125. As mentioned above, interface object 125 may be a COM object, thereby allowing intercommunication between processes. In some embodiments, managing web page generation infrastructure 110 can send message 117 to interface module 125 whereupon interface module 125 can present the information in message 117 in a way that is readable by other web page generation infrastructure 130. For example, interface module 125 may modify or translate session state information 116 and insert translated session state information 116T into message 117. In some embodiments, interface object 125 may be capable of storing or temporarily storing session state information 116 and/or web page request 105.

The method 200 of FIG. 2 includes an act of receiving a response to the request and modified session state information from the object, the response having been generated by and the modified session state information having been modified by the other web page generation infrastructure (act 240). For example, session state processor 115 may receive a response (e.g. response 140) to web page request 105 and modified, modified session state information 141 from interface object 125. Response 140 can have been generated by and the modified session state information 141T can have been modified by other web page generation infrastructure 130. In general, the process of generating a response and modifying session state information 116T is described below in relation to FIG. 3, Method 300.

The method 200 of FIG. 2 includes an act of the managing web page generation infrastructure copying the modified session state information to the session state container (act 250). For example, managing web page generation infrastructure 110 may copy modified session state information 141 to session state storage module 120. Thus, in some embodiments, the stored modified session state information 141 may be used during the processing of future web page requests received from the same client. For example, in Act 230 session state processor 115 determines whether prior session state information for the existing session exists. In other embodiments, computer system 101 may receive web page request 105 which may only have information directed to managing web page generation infrastructure 110. In such cases, session state processor 115 could check for stored session information in storage module 120, process the session and send out a response (e.g. response 140). Thus, whether web page request 105 includes information directed to managing infrastructure 110 or to managing infrastructure 110 and other infrastructure 130, session state processor 115 can check for stored session state information.

The method 200 of FIG. 2 includes an act of the managing web page generation infrastructure returning the response to the client computer system (act 260). For example, managing web page generation infrastructure may return response 140 to the client computer system. In some embodiments, returning response 140 includes returning an HTTP response to a web browser on the client computer system.

In some embodiments, the computer system may receive multiple web page requests (e.g. request 105) over the course of one or more sessions. In such cases, for example, managing web page generation infrastructure 110 may receive a second request for web based content from the client computer system where the second request is directed to other web page generation infrastructure 130. Continuing this example, managing web page generation infrastructure 110 may access session state storage module 120 to determine whether session state information 116 for an existing session with the client exists. Further, upon determining that session state information 116 for the existing session exists, session state processor 115 may access any state information for the existing session including the portion of session state copied to session state storage module 120 by managing web page generation infrastructure 120.

Continuing this example, managing infrastructure 110 may transfer the second request and accessed session state information 116 to interface object 125 which may be configured to interface with other web page generation infrastructure 130. Further, managing infrastructure 110 may receive a second response to the second request and modified session state information 141 from interface object 125, the second response having been generated by and the modified session state information 141 having been modified by other web page generation infrastructure 130. Continuing this example, managing web page generation infrastructure 110 may copy modified session state information 141 to session state storage module 120. And lastly, in this example, managing web page generation infrastructure 110 may return the second response (e.g. response 140) to the client computer system.

In some cases, a plurality of computer systems may be organized into a web server farm where each of the computer systems is configured in substantially the same manner. Furthermore, in some embodiments, such a web server farm may be configured for load balancing and fault tolerance such that if one of the plurality of computer systems loses functionality, one or more of the remainder of computer systems in the web server farm automatically assumes the responsibilities of the computer system that lost functionality.

Figure 3:
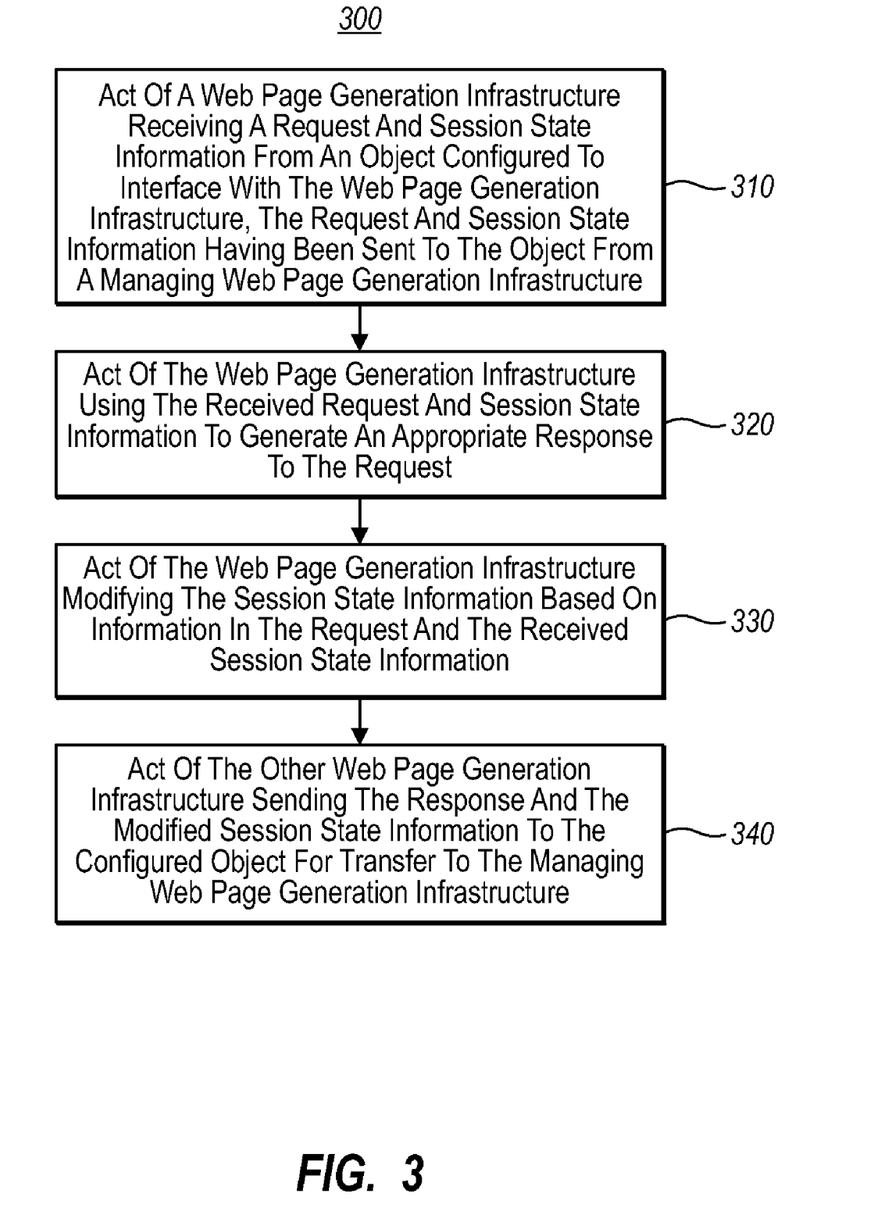
FIG. 3 illustrates an embodiment of a method for sharing session state information between web page generation infrastructures.

FIG. 3 illustrates a flowchart of a method 300 for sharing session state information between web page generation infrastructures. As the method 300 may be performed in the context of the environment 100 of FIG. 1, the method 300 of FIG. 3 will now be described with frequent reference to FIG. 1.

The method 300 of FIG. 3 includes an act of a web page generation infrastructure receiving a request and session state information from an object configured to interface with the web page generation infrastructure, the request and session state information having been sent to the object from a managing web page generation infrastructure (act 310). For example, other web page generation infrastructure 130 (e.g. ASP) may receive request 105 and session state information 116T (combined in message 117) from interface object 125, where request 105 and session state information 116T have been sent to interface object 125 from managing web page generation infrastructure 110 (e.g. ASP.NET). In some cases, web page request 105 may comprise an HTTP request sent from a web browser on a client computer system.

The method 300 of FIG. 3 includes an act of the web page generation infrastructure using the received request and session state information to generate an appropriate response to the request (act 320). For example, other web page generation infrastructure 130 may use received web page request 105 and session state information 116T to generate an appropriate response to request 105. For instance, in some cases, other web page generation infrastructure 130 may receive request 105 and session state information 116T and, based on the information in request 105 and the information in session state information 116T, can generate a dynamic web page or other dynamic content based on request 105 and information 116T. For example, if a user browsed to an online banking website that used other web page generation infrastructure 130 to generate dynamic web pages, and the user requested a web page based on their account information, managing web page generation infrastructure 110 could send the user's request (e.g. request 105) along with any previous session information (e.g. session state information 116T) to infrastructure 130 for processing. Infrastructure 130 could then use the received information to dynamically generate a web page based on request 105 and session state information 116T.

In some embodiments, session state information 116 may comprise information relating to items browsed and selected for inclusion in an online shopping cart via a web browser. Furthermore, information in request 105 used to modify session state information 116T may comprise the updated selections of items to be included in the computer user's online shopping cart. In some cases, information in request 105 used to modify the session state information may comprise updated identification information for the computer user. In some embodiments, such information may be stored in a cookie.

The method 300 of FIG. 3 includes an act of the web page generation infrastructure modifying the session state information based on information in the request and the received session state information (act 330). For example, other web page generation infrastructure 130 may modify session state information 116T based on information in web page request 105 and received session state information 116T. As explained above, session state information 116T may be modified based on any type of information in web page request 105 or any type of state information in session state information 116T.

The method 300 of FIG. 3 includes an act of the other web page generation infrastructure sending the response and the modified session state information to the configured object for transfer to the managing web page generation infrastructure (act 340). For example, other web page generation infrastructure 130 may send a response and modified session state information 141T to interface object 125 for transfer to managing web page generation infrastructure 110. As explained above, interface object 125 may be configured to allow intercommunication between processes. In some embodiments, interface object 125 may comprise a COM object.

Figure 4:
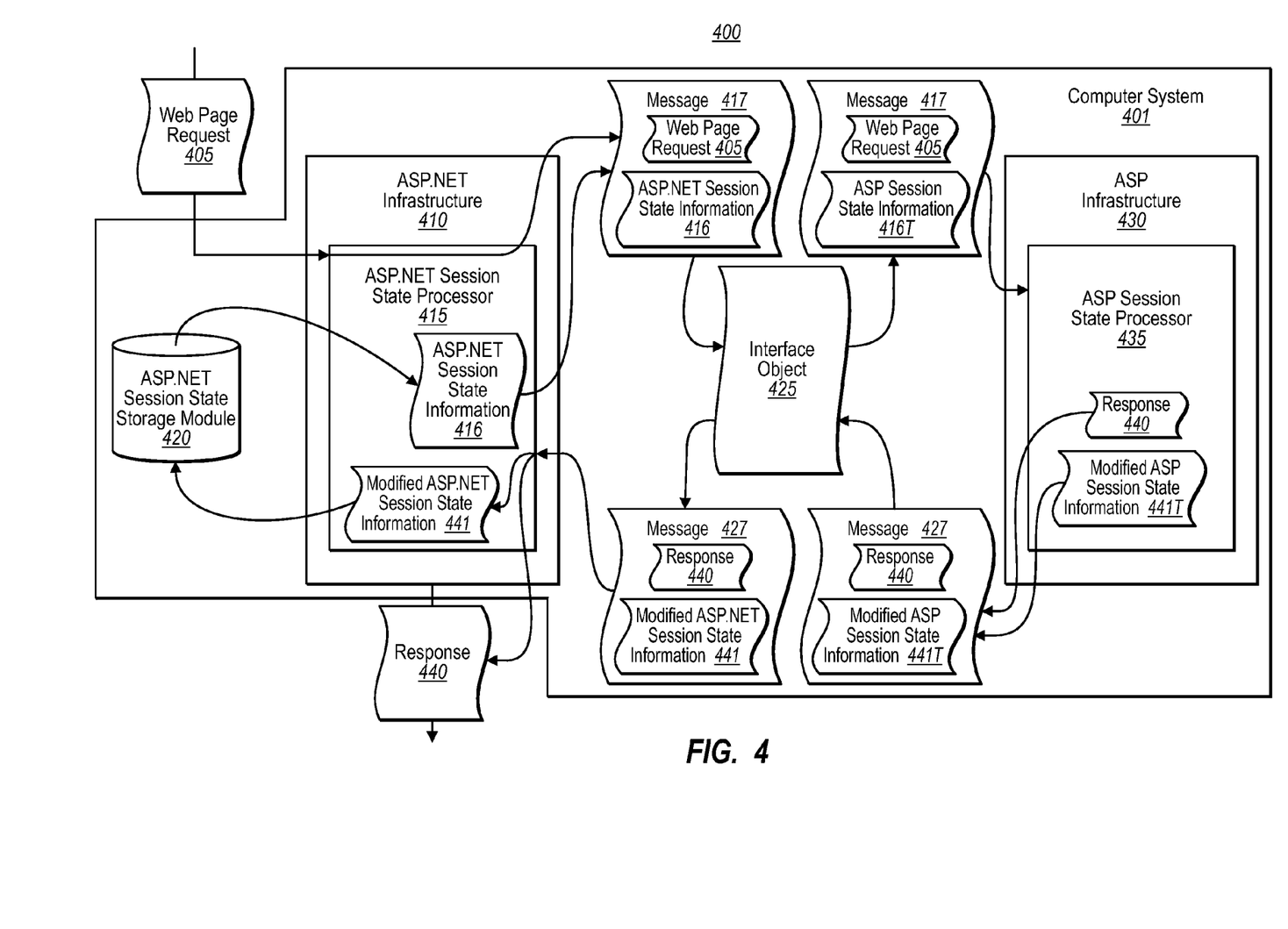
FIG. 4 illustrates a computing environment for sharing session state information between ASP and ASP.NET.

FIG. 4 illustrates a computer architecture 400 in which the principles of one embodiment of the present invention may be employed. For example, ASP.NET infrastructure 410 may be configured to run method 200 as outlined above. Furthermore, ASP infrastructure 430 may be configured to run method 300 as outlined above.

For example, in computer system 401, ASP.NET session state processor 415 in ASP.NET Infrastructure 410 may receive web page request 405 from a client computer system. Web page request 405 may be incorporated into message 417 along with ASP.NET session state information 416, which may have been retrieved from ASP.NET session state storage module 420. Message 417 may be sent to interface object 425. Interface object 425 may then send message 417 with web page request 105 and ASP session state information 416T to ASP session state processor 435 in ASP infrastructure 430.

Continuing this example, ASP session state processor 435 may generate response 440 and modified ASP session state information 441T. Response 440 and modified ASP session state information 441T may be incorporated in message 427 which may be sent to interface object 425. Interface object 425 may send message 427 including response 440 and modified ASP.NET session state information 441 to ASP.NET session state processor 415. Modified ASP.NET session state information 441 may be stored in ASP.NET session state storage module 420. ASP.NET infrastructure 410 may send response 440 to a client computer system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for sharing session state information between a plurality of web page generation infrastructures, the method performed in a computing environment comprising one or more computer processors and a web server running a plurality of different web page generation infrastructures, each web page generation infrastructure having a native configuration of session state information, the method comprising:
    a managing web page generation infrastructure receiving from a client computer system a request for a web page, the request directed to one of the plurality of different web page generation infrastructures;
    the request including information indicating which type of web page generating infrastructure to use to generate a response to the request;
    the managing web page generation infrastructure accessing a session state container and determining whether session state information for an existing session with the client already exists;
    upon determining that session state information for the existing session exists, the managing web page generation infrastructure transferring the request and the session state information to an interface object which interfaces with the one of the plurality of different web page generation infrastructures;
    the interface object translating the session state information to render the translated session state information into a format compatible with a native configuration of session state information of the one of the plurality of different web page generation infrastructures;
    the one of the plurality of different web page generation infrastructures receiving the request and the translated session state information;
    the one of the plurality of different web page generation infrastructures using the request and the translated session state information to generate a response to the request; the managing web page generation infrastructure receiving a response to the request and modified session state information from the interface object, the response having been generated by and the modified session state information having been modified by the one of the plurality of different web page generation infrastructures;
    the managing web page generation infrastructure copying the modified session state information to the session state container; and
    the managing web page generation infrastructure returning the response to the client computer system.

2. The method of claim 1, further comprising:
    the managing web page generation infrastructure receiving a second request for web based content from the client computer system, the second request directed to the one of the plurality of different web page generation infrastructures;
    the managing web page generation infrastructure accessing the session state container to determine whether session state information for an existing session with the client exists;
    upon determining that session state information for the existing session exists, accessing any state information for the existing session including the portion of session stated copied to the session state container by the managing web page generation infrastructure;
    transferring the second request and the accessed state information to an object configured to interface with the one of the plurality of different web page generation infrastructures;
    receiving a second response to the second request and modified session state information from the object, the second response having been generated by and the modified session state information having been modified by the one of the plurality of different web page generation infrastructures;
    the managing web page generation infrastructure copying the modified session state information to the session state container; and
    the managing web page generation infrastructure returning the second response to the client computer system.

3. The method of claim 1, wherein the request comprises an HTTP request sent from a web browser on the client computer system.

4. The method of claim 1, wherein the object configured to interface with the other web page generation infrastructure comprises a component object model (COM) object.

5. The method of claim 1, wherein the session state information includes information relating to items browsed and entered into an online shopping cart via a web browser.

6. The method of claim 1, wherein the response comprises an HTTP response returned to a web browser on the client computer system.

7. A computer program product comprising one or more physical computer readable storage media having instructions encoded thereon which, when executed upon one or more computer processors, perform a method comprising:
    a managing web page generation infrastructure receiving from a client computer system a request for a web page, the request directed to one of the plurality of different web page generation infrastructures;
    the request including information indicating which type of web page generating infrastructure to use to generate a response to the request;
    the managing web page generation infrastructure accessing a session state container and determining whether session state information for an existing session with the client already exists;
    upon determining that session state information for the existing session exists, the managing web page generation infrastructure transferring the request and the session state information to an interface object which interfaces with the one of the plurality of different web page generation infrastructures;
    the interface object translating the session state information to render the translated session state information into a format compatible with native configuration of session state information of the one of the plurality of different web page generation infrastructures;
    the one of the plurality of different web page generation infrastructures receiving the request and the translated session state information;
    the one of the plurality of different web page generation infrastructures using the request and the translated session state information to generate a response to the request; the managing web page generation infrastructure receiving a response to the request and modified session state information from the interface object, the response having been generated by and the modified session state information having been modified by the one of the plurality of different web page generation infrastructures;

the managing web page generation infrastructure copying the modified session state information to the session state container; and the managing web page generation infrastructure returning the response to the client computer system.

8. The computer program product of claim 7, wherein the method performed further comprises:

the managing web page generation infrastructure receiving a second request for web based content from the client computer system, the second request directed to the one of the plurality of different web page generation infrastructures;

the managing web page generation infrastructure accessing the session state container to determine whether session state information for an existing session with the client exists;

upon determining that session state information for the existing session exists, accessing any state information for the existing session including the portion of session stated copied to the session state container by the managing web page generation infrastructure;

transferring the second request and the accessed state information to an object configured to interface with the one of the plurality of different web page generation infrastructures;

receiving a second response to the second request and modified session state information from the object, the second response having been generated by and the modified session state information having been modified by the one of the plurality of different web page generation infrastructures;

the managing web page generation infrastructure copying the modified session state information to the session state container; and the managing web page generation infrastructure returning the second response to the client computer system.

9. The computer program product of claim 7, wherein the request comprises an HTTP request sent from a web browser on the client computer system.

10. The computer program product of claim 7, wherein the object configured to interface with the other web page generation infrastructure comprises a component object model (COM) object.

11. The computer program product of claim 7, wherein the session state information includes information relating to items browsed and entered into an online shopping cart via a web browser.

12. The computer program product of claim 7, wherein the response comprises an HTTP response returned to a web browser on the client computer system.

* * * * *